United States Patent
Ninomiya

(10) Patent No.: US 8,132,926 B2
(45) Date of Patent: Mar. 13, 2012

(54) ELECTRO-OPTIC DEVICE AND AN ELECTRONIC APPARATUS

(75) Inventor: Takanori Ninomiya, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 12/632,390

(22) Filed: Dec. 7, 2009

(65) Prior Publication Data

US 2010/0165461 A1  Jul. 1, 2010

(30) Foreign Application Priority Data

Dec. 26, 2008  (JP) .................................. 2008-332970

(51) Int. Cl.
*G02B 1/00* (2006.01)
(52) U.S. Cl. ...................................................... 359/507
(58) Field of Classification Search .................. 359/507, 359/508
See application file for complete search history.

(56) References Cited

U.S. PATENT DOCUMENTS

| | | | |
|---|---|---|---|
| 7,758,259 B2* | 7/2010 | Noto | 359/507 |
| 2003/0223045 A1 | 12/2003 | Saitoh | |
| 2008/0198457 A1 | 8/2008 | Sakai et al. | |

FOREIGN PATENT DOCUMENTS

| JP | 2003-279942 A | 10/2003 |
|---|---|---|
| JP | 2006-39270 A | 2/2006 |
| JP | 2007-25153 A | 2/2007 |
| JP | 2008-156648 A | 7/2008 |
| JP | 2008-233878 A | 10/2008 |

* cited by examiner

*Primary Examiner* — Euncha Cherry
(74) *Attorney, Agent, or Firm* — AdvantEdge Law Group, LLC

(57) ABSTRACT

An electro-optic device includes an electro-optic element and a dust-proof substrate which is joined to at least one surface of the electro-optic element. The dust-proof substrate has a plurality of protrusions on a surface opposite to the surface of the electro-optic element to which the dust-proof substrate is joined.

15 Claims, 12 Drawing Sheets

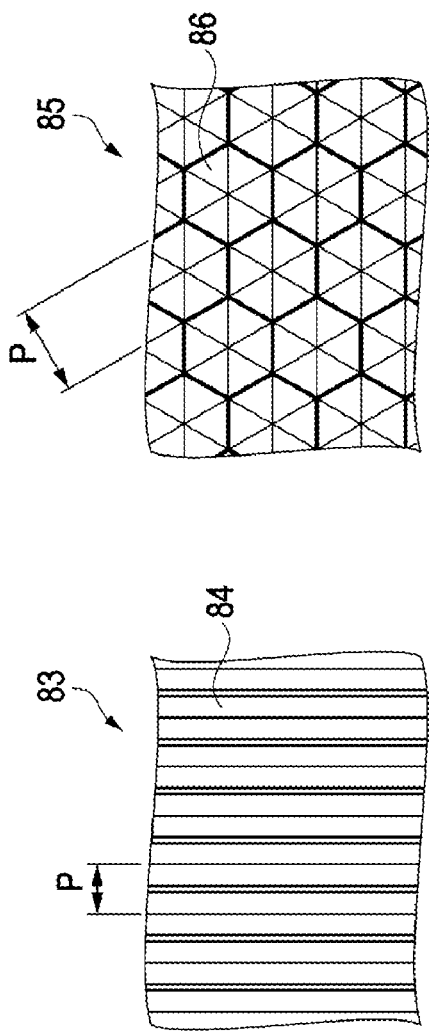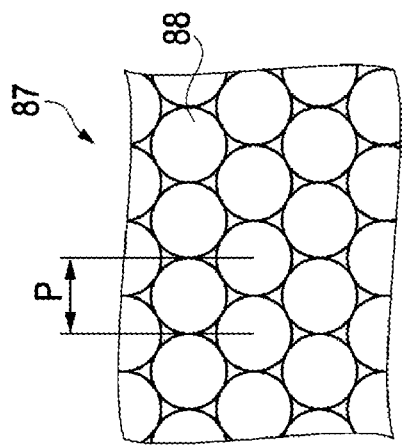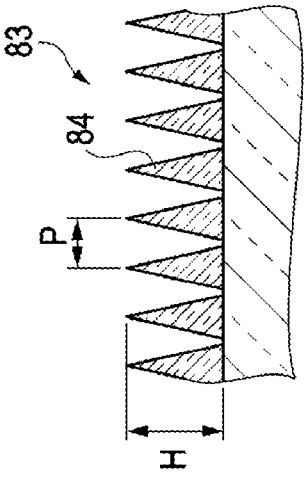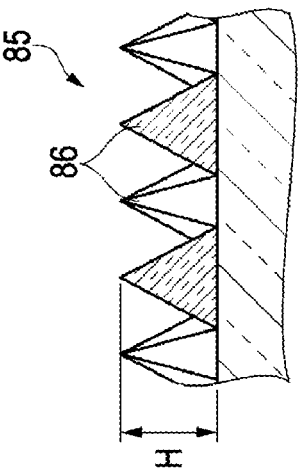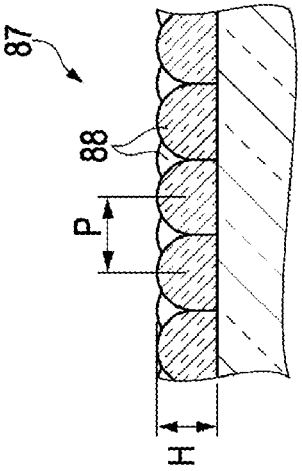

ELECTRO-OPTIC DEVICE AND AN ELECTRONIC APPARATUS

BACKGROUND

1. Technical Field

The present invention relates to an electro-optic device having an electro-optic element, a dust-proof substrate disposed on one surface of the electro-optic element, and an electronic apparatus including the electro-optic device.

2. Related Art

In the past, there were known electro-optic devices such as a liquid crystal device which includes an electro-optic element such as a liquid crystal panel modulating light flux emitted from a light source in accordance with image information or the like. The liquid crystal device is used as a display device in an information apparatus or as a light valve in a projection type display apparatus, for example.

In such a display device, display quality may deteriorate when dusts or the like attach to a display surface. This is because an image of dots different from a display image is viewed on the display surface. In particular, dusts may affect the display quality in an apparatus which magnifies a display area of the liquid crystal panel to view a display picture, like a projection type display apparatus such as a liquid crystal projector, since the dusts or the like become magnified images and thus are displayed on the display picture.

JP-A-2003-279942 discloses an electro-optic device and a projection type display apparatus which includes a coating member containing an antistatic material and inhibits the charged dusts from being attached to a liquid crystal panel by static electricity.

In a projection type display apparatus such as a liquid crystal projector, a dust-proof member is provided to inhibit dusts from being attached directly to the display surface of a liquid crystal panel. The dusts are permitted to be attached to the dust-proof member by providing the dust-proof member, even though dusts or the like are attached. Therefore, by allowing the positions of the dusts or the like to be away from the focal position of a projection lens, the dusts can be made not to be clearly displayed. However, when the dusts are attached to the surface of the dust-proof member, the images of the attached dusts are displayed as vague unfocused images. Therefore, it is desirable that the dusts or the like are not attached to the dust-proof member either. JP-A-2007-25153 discloses a liquid crystal panel block or a liquid crystal projector which hardly allows dusts or the like to be attached by coating the surface of a dust-proof member with a fluorine resin having a low friction coefficient.

However, even though the friction coefficient is made low as in JP-A-2007-25153, the dusts or the like floating and entering the inside of the apparatus are charged by friction in many cases, and thus may be attached by static electricity. Moreover, in order to make the antistatic material effective as in JP-A-2003-279942, it is necessary to form a discharge path for discharging electricity from the antistatic material. Therefore, a problem arises in that the apparatus becomes complicated.

SUMMARY

An advantage of some aspects of the invention is that it provides an electro-optic device and an electronic apparatus including the electro-optic device.

Applied Example 1

According to an aspect of the invention, there is provided an electro-optic device including: an electro-optic element; and a dust-proof substrate which is joined to at least one surface of the electro-optic element. The dust-proof substrate has a plurality of protrusions on a surface opposite to the surface of the electro-optic element to which the dust-proof substrate is joined.

According to the electro-optic device, the plurality of protrusions is formed on the dust-proof substrate. Since the protrusions exist, the area of the dust-proof substrate with which dusts or the like come in contact becomes smaller than that of a flat surface. Accordingly, it is possible to inhibit the dusts or the like from being attached to the dust-proof substrate. Since it is possible to inhibit the dusts or the like from being attached to the surface of an area through which the light flux emitted from the electro-optic element penetrates, the deterioration in the display quality caused by the attachment of the dusts or the like can be prevented. There is a high possibility that the dusts or the like inhibited from approaching the electro-optic element by the dust-proof substrate come into contact with the surface opposite to the surface of the dust-proof substrate facing the electro-optic element. By forming the protrusions on this surface, the area of the dust-proof substrate with which the dusts or the like come in contact can be configured as the area to which the dusts or the like are hardly attached.

Applied Example 2

In the electro-optic device according to the above aspect of the invention, the dust-proof substrate may be joined to each of a light-entering surface and a light-exiting surface of the electro-optic element.

According to the electro-optic device, since the dust-proof substrate is disposed on the incident side and the exit side of the light flux in the electro-optic element, it is possible for the dust-proof substrate to reliably protect the electro-optic element against the influence of the surroundings.

Applied Example 3

In the electro-optic device according to the above aspect of the invention, the dust-proof substrate may be disposed on the exit side of the light flux in the electro-optic element.

According to the electro-optic device, the dust-proof substrate is disposed on the exit side of the light flux in the electro-optic element. The electro-optic device is an electro-optic device of a projection type display apparatus, for example. In the projection type display apparatus, a projection optic system is disposed close to the electro-optic device in many cases. The dusts or the like floating in the air easily come into contact with the electro-optic device when the dusts or the like float between the electro-optic device and the optic system disposed close to each other. However, by disposing the dust-proof substrate on the exit side, it is possible to inhibit the dusts or the like that have come into contact from being attached.

The electro-optic device is an electro-optic device of a display apparatus including a display surface which is directly observed, for example. The exit side of the light flux is configured as the observed surface. By disposing the dust-proof substrate on the exit side, it is possible to inhibit the dusts or the like from being attached to the observed surface.

Applied Example 4

In the electro-optic device according to the above aspect of the invention, the height of the plurality of protrusions and the disposition pitch between the protrusions may be smaller than the wavelength of incident light which is incident on the electro-optic element.

According to the electro-optic device, the protrusions with the height lower than the wavelength of the incident light are disposed at the disposition pitch smaller than the wavelength of the incident light. In the configuration of the optic element or the electro-optic device, a member through which the light flux penetrates is made of glass and has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, light with a wavelength longer than the height and the disposition pitch of the protrusions is known to be rarely reflected from the boundary surface. By disposing the protrusions smaller than the wavelength of the incident light at the disposition pitch smaller than the wavelength of the incident light, it is possible to inhibit the incident light from being reflected.

Applied Example 5

In the electro-optic device according to the above aspect of the invention, the height of the plurality of protrusions and the disposition pitch between the protrusions may be smaller than 430 nm.

According to the electro-optic device, the protrusions with the height lower than 430 nm are disposed at the disposition pitch smaller than 430 nm. In the configuration of the optic element or the electro-optic device, the member through which the light flux penetrates is made of glass or the like and has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, light with the wavelength that is longer than the height and the disposition pitch of the protrusions is known to be rarely reflected from the boundary surface.

The wavelength of the blue color with the shortest wavelength among the three primary colors of light usually used in the electro-optic device is generally 430 nm. By disposing the protrusions smaller than 430 nm at the disposition pitch smaller than 430 nm, it is possible to inhibit the three primary colors of light from being reflected.

Applied Example 6

In the electro-optic device according to the above aspect of the invention, the height of the plurality of protrusions and the disposition pitch between the protrusions are smaller than the wavelength of the visible light.

According to the electro-optic device, the protrusions with the height that is lower than the wavelength of the visible light are disposed at the disposition pitch smaller than the wavelength of the visible light. In the configuration of the optic element or the electro-optic device, the member through which the light flux penetrates has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, light with the wavelength that is longer than the height and the disposition pitch of the protrusions is known to be rarely reflected from the boundary surface. By disposing the protrusions of the wavelength smaller than that of the visible light at the disposition pitch smaller than the wavelength of the visible light, it is possible to inhibit the visible light from being reflected.

Applied Example 7

In the electro-optic device according to the above aspect of the invention, the height of the plurality of protrusions and the disposition pitch between the protrusions may be smaller than 380 nm.

According to the electro-optic device, the protrusions with the height lower than 380 nm are disposed at the disposition pitch smaller than 380 nm. In the configuration of the optic element or the electro-optic device, the member through which the light flux penetrates has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, light with the wavelength longer than the height and the disposition pitch of the protrusions is known to be rarely reflected from the boundary surface.

The range of light which the humans can perceive is light with the wavelength equal to or larger than 380 nm. By disposing the protrusions smaller than 380 nm at the disposition pitch smaller than 380 nm, it is possible to inhibit the light which the humans can perceive from being reflected.

Applied Example 8

In the electro-optic device according to the above aspect of the invention, the protrusions may be formed upright on the surface of the dust-proof substrate and the shape of at least one cross-section of the protrusion perpendicular to the surface of the dust-proof substrate may be cuneate.

According to the electro-optic device, the protrusions have the cross-section of the cuneate shape on the cross-section surface perpendicular to the surface to which the protrusions are formed upright. In the configuration of the optic element or the electro-optic device, the member through which the light flux penetrates has a refractive index different from that of air. Light is reflected owing to the considerable variation in the refractive index in the boundary surface between a glass or the like and air. Since the protrusion has the cross-section of the cuneate shape in the direction perpendicular to the surface on which the protrusion is formed upright, the area of the protrusion in the cross-section in the direction parallel to the surface gradually varies from the surface on which the protrusion is formed upright. With such a configuration, it is possible to gradually vary the refractive index in the range of the height of the protrusion. By gradually varying the refractive index, it is possible to inhibit the light from being reflected due to the considerable variation in the refractive index on the surface of the dust-proof substrate.

Applied Example 9

In the electro-optic device according to the above aspect of the invention, the front end of the cuneate shape may be formed in an arc shape.

According to the electro-optic device, the front end of the protrusion has the curved surface. Since the front end of the protrusion has the curved surface, the intensity of the front end of the protrusion becomes stronger than that of the protrusion with a pointed shape.

Applied Example 10

In the electro-optic device according to the above aspect of the invention, the protrusions may be formed in a spherical crown shape upright on the surface of the dust-proof substrate.

According to the electro-optic device, the protrusion has the spherical crown shape. In the configuration of the optic element or the electro-optic device, the member through which the light flux penetrates has a refractive index different from that of air. Light is reflected owing to the considerable variation in the refractive index in the boundary surface between a glass or the like and air. Since the protrusion has the spherical crown shape, the area of the protrusion in the cross-section in the direction parallel to the surface on which the protrusion is formed upright gradually varies from the surface on which the protrusion is formed upright. With such a configuration, it is possible to gradually vary the refractive index in the range of the height of the protrusion. By gradually varying the refractive index, it is possible to inhibit the light from being reflected due to the considerable variation in the refractive index on the surface of the dust-proof substrate. Since the protrusion has the curved surface, the intensity of the protrusion can be made stronger than that of the protrusion with a corner.

Applied Example 11

In the electro-optic device according to the above aspect of the invention, the protrusions may be formed upright on the surface of the dust-proof substrate and may have a cylindrical shape, a prismatic shape, a conical shape, or a pyramidal shape of which the front end is formed in a spherical crown shape.

According to the electro-optic device, the front end of the protrusion has the cylindrical shape, the prismatic shape, the conical shape, or the pyramidal shape of the spherical crown shape. In the configuration of the optic element or the electro-optic device, the member through which the light flux penetrates has a refractive index different from that of air. Light is reflected owing to the considerable variation in the refractive index in the boundary surface between a glass or the like and air. Since the protrusion has a cylindrical shape, a prismatic shape, a conical shape, or a pyramidal shape of the spherical crown shape, the area of the protrusion in the cross-section in the direction parallel to the surface on which the protrusion is formed upright gradually varies from the surface on which the protrusion is formed upright. With such a configuration, it is possible to gradually vary the refractive index in the range of the height of the protrusion. By gradually varying the refractive index, it is possible to inhibit the light from being reflected due to the considerable variation in the refractive index on the surface of the dust-proof substrate.

Applied Example 12

In the electro-optic device according to the above aspect of the invention, the plurality of protrusions may be disposed in an area corresponding to an optic modulation area of the electro-optic element on the surface of the dust-proof substrate.

According to the electro-optic device, the protrusions are disposed only in the area corresponding to the optic modulation area of the electro-optic element. Here, the optic modulation area is an area where light is modulated in accordance with an electric signal in the electro-optic device. For example, the optic modulation area is a pixel area where pixels permitting or blocking the penetration of light by controlling the light in accordance with a control signal in a liquid crystal device. Accordingly, the area corresponding to the optic modulation area is an area contributing to inhibiting the dusts or the like from being attached or the light from being reflected and improving the display quality or the like in the electro-optic device. By forming the protrusions only in this area, it is possible to form the protrusions more efficiently without forming unnecessary protrusions.

Applied Example 13

The electro-optic device according to the above aspect of the invention may further include a holding case which holds the electro-optic element or the electro-optic element and the dust-proof substrate. The holding case may come into contact with the electro-optic element or a portion where the protrusions are not formed on the dust-proof substrate to hold the electro-optic element or the dust-proof substrate.

According to the electro-optic device, the electro-optic element or the dust-proof substrate are held in the holding case in the portion where the protrusions are not formed. With such a configuration, since the protrusions come into contact with the holding case, it is possible to inhibit the minute protrusions from being damaged.

Applied Example 14

According to another aspect of the invention, there is provided a dust-proof substrate which is joined to an electro-optic element included in an electro-optic device. A plurality of protrusions is formed in an area opposite to the surface of the dust-proof substrate facing the electro-optic element.

According to the dust-proof substrate, the plurality of protrusions is formed on the surface of the dust-proof substrate. Since the protrusions exist, the area of the dust-proof substrate with which dusts or the like come in contact becomes smaller than that of a flat surface. Accordingly, it is possible to inhibit the dusts or the like from being attached to the dust-proof substrate.

There is a high possibility that the dusts or the like inhibited from approaching the electro-optic element owing to the dust-proof substrate come into contact with the surface opposite to the surface of the dust-proof substrate facing the electro-optic element. By forming the protrusions on this surface, the area of the dust-proof substrate with which the dusts or the like come in contact can be configured as the area to which the dusts or the like are hardly attached.

Applied Example 15

In the dust-proof substrate according to the above aspect of the invention, the height of the plurality of protrusions and the disposition pitch between the protrusions may be smaller than the wavelength of the incident light which is incident on the electro-optic element.

According to the dust-proof substrate, the protrusions with the height lower than the wavelength of the incident light are disposed at the disposition pitch smaller than the wavelength of the incident light. The dust-proof substrate is made of glass or the like and has a refractive index different from that of air. Owing to the considerable variation in the refractive index in the boundary surface between a glass or the like and the air, light is reflected. By forming the plurality of protrusions, it is possible to gradually vary the refractive index in the range of the height of the protrusions. By doing so, light with the wavelength longer than the height and the disposition pitch of the protrusions is known to be rarely reflected from the boundary surface. By disposing the protrusions of the wavelength smaller than that of the incident light at the disposition pitch smaller than the wavelength of the incident light, it is possible to inhibit the incident light from being reflected.

Applied Example 16

In the dust-proof substrate according to the above aspect of the invention, the height of the plurality of protrusions and the disposition pitch between the protrusions may be smaller than 430 nm.

According to the dust-proof substrate, the protrusions with the height lower than 430 nm are disposed at the disposition pitch smaller than 430 nm on the dust-proof substrate. The dust-proof substrate is made of glass or the like and has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, the light with the wavelength longer than the height and the disposition pitch of the protrusions is known to be rarely reflected from the boundary surface.

The wavelength of the blue color with the shortest wavelength among the three primary colors of light usually used in the electro-optic device is generally 430 nm. By disposing the protrusions smaller than 430 nm at the disposition pitch smaller than 430 nm, it is possible to inhibit the three primary colors of light from being reflected.

Applied Example 17

In the dust-proof substrate according to the above aspect of the invention, the height of the plurality of protrusions and the disposition pitch between the protrusions are smaller than the wavelength of the visible light.

According to the dust-proof substrate, the protrusions with the height lower than the wavelength of the visible light are disposed at the disposition pitch smaller than the wavelength of the visible light on the dust-proof substrate. The dust-proof substrate is made of glass or the like and has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, the light with the wavelength longer than the height and the disposition pitch of the protrusions is known to be rarely reflected from the boundary surface. By disposing the protrusions of the wavelength smaller than that of the visible light at the disposition pitch smaller than the wavelength of the visible light, it is possible to inhibit the incident light from being reflected.

Applied Example 18

In the dust-proof substrate according to the above aspect of the invention, the height of the plurality of protrusions and the disposition pitch between the protrusions may be smaller than 380 nm.

According to the dust-proof substrate, the protrusions with the height lower than 380 nm are disposed at the disposition pitch smaller than 380 nm on the dust-proof substrate. The dust-proof substrate is made of glass or the like and has a refractive index different from that of air. Light is reflected owing to the considerable variation in the refractive index in the boundary surface between a glass or the like and air. By forming the plurality of protrusions, it is possible to gradually vary the refractive index in the range of the height of the protrusions. By doing so, light with the wavelength longer than the height and the disposition pitch of the protrusions is known to be rarely reflected from the boundary surface.

The range of light which the humans can perceive is light with the wavelength equal to or larger than 380 nm. By disposing the protrusions smaller than 380 nm at the disposition pitch smaller than 380 nm, it is possible to inhibit the light which the humans can perceive from being reflected.

Applied Example 19

In the dust-proof substrate according to the above aspect of the invention, the protrusions may be formed upright on the surface of the dust-proof substrate and the shape of at least one cross-section of the protrusion perpendicular to the surface of the dust-proof substrate may be cuneate.

According to the dust-proof substrate, the protrusions have the cross-section of the cuneate shape on the cross-section surface perpendicular to the surface to which the protrusions are formed upright. The dust-proof substrate is made of glass or the like and has a refractive index different from that of air. Light is reflected owing to the considerable variation in the refractive index in the boundary surface between a glass or the like and air. Since the protrusion has the cross-section of the cuneate shape in the direction perpendicular to the surface on which the protrusion is formed upright, the area of the protrusion in the cross-section in the direction parallel to the surface on which the protrusion is formed upright gradually varies from the surface on which the protrusion is formed upright. With such a configuration, it is possible to gradually vary the refractive index in the range of the height of the protrusion. By gradually varying the refractive index, it is possible to inhibit the light from being reflected due to the considerable variation in the refractive index on the surface of the dust-proof substrate.

Applied Example 20

In the dust-proof substrate according to the above aspect of the invention, the front end of the cuneate shape may be formed in an arc shape.

According to the dust-proof substrate, the front end of the protrusion has the curved surface. Since the front end of the protrusion has the curved surface, the intensity of the front end of the protrusion becomes stronger than that of the protrusion with a sharp shape.

Applied Example 21

In the dust-proof substrate according to the above aspect of the invention, the protrusions may be formed in a spherical crown shape upright on the surface of the dust-proof substrate.

According to the dust-proof substrate, the protrusions may be formed in a spherical crown shape. The dust-proof substrate is made of glass or the like and has a refractive index different from that of air. Light is reflected owing to the considerable variation in the refractive index in the boundary surface between a glass or the like and air. Since the protrusion has the spherical crown shape, the area of the protrusion in the cross-section in the direction parallel to the surface on which the protrusion is formed upright gradually varies from the surface on which the protrusion is formed upright. With such a configuration, it is possible to gradually vary the refractive index in the range of the height of the protrusion. By gradually varying the refractive index, it is possible to inhibit the light from being reflected due to the considerable variation in the refractive index on the surface of the dust-proof substrate. Since the protrusion has the curved surface, the intensity of the protrusion can be made stronger than that of the protrusion with a corner.

Applied Example 22

In the dust-proof substrate according to the above aspect of the invention, the protrusions may have a cylindrical shape, a prismatic shape, a conical shape, or a pyramidal shape of which the front end is formed in the spherical crown shape.

According to the dust-proof substrate, the protrusion have a cylindrical shape, a prismatic shape, a conical shape, or a pyramidal shape of which the front end is formed in the spherical crown shape. The dust-proof substrate is made of glass or the like and has a refractive index different from that of air. Light is reflected owing to the considerable variation in the refractive index in the boundary surface between a glass or the like and air. Since the protrusion has a cylindrical shape, a prismatic shape, a conical shape, or a pyramidal shape of which the front end is formed in the spherical crown shape, the area of the protrusion in the cross-section in the direction parallel to the surface on which the protrusion is formed upright gradually varies from the surface on which the protrusion is formed upright. With such a configuration, it is possible to gradually vary the refractive index in the range of the height of the protrusion. By gradually varying the refractive index, it is possible to inhibit the light from being reflected due to the considerable variation in the refractive index on the surface of the dust-proof substrate.

Applied Example 23

In the dust-proof substrate according to the above aspect of the invention, the plurality of protrusions may be disposed in an area corresponding to an optic modulation area of the electro-optic element on the surface of the dust-proof substrate in a state where the dust-proof substrate and the electro-optic element are disposed in the electro-optic device.

According to the dust-proof substrate, the protrusions are disposed only in the area corresponding to the optic modulation area of the electro-optic element. Here, the optic modulation area is an area where light is modulated in accordance with an electric signal in the electro-optic device. For example, the optic modulation area is a pixel area where pixels permitting or blocking the penetration of light by controlling the light in accordance with a control signal in a liquid crystal device. Accordingly, the area corresponding to the optic modulation area is an area contributing to inhibiting the dusts or the like from being attached or the light from being reflected and improving the display quality or the like in the electro-optic device. By forming the protrusions only in this area, it is possible to form the protrusions more efficiently without forming unnecessary protrusions.

Applied Example 24

According to still another aspect of the invention, there is provided an electronic apparatus including the electro-optic device according to the above aspect of the invention or the dust-proof substrate according to the above aspect of the invention.

According to the electronic apparatus, an area containing an area through which the light flux emitted from the electro-optic element penetrates is provided with the electro-optic device to which dusts or the like are hardly attached or the dust-proof substrate to which dusts or the like are hardly attached. Accordingly, it is possible to embody the electronic apparatus in which the dusts or the like are hardly attached to the area through which the light flux emitted from the electro-optic element penetrates.

BRIEF DESCRIPTION OF THE DRAWINGS

The invention will be described with reference to the accompanying drawings, wherein like numbers reference like elements.

FIGS. 7A, 7C, and 7E are enlarged plan views illustrating the surface of each dust-proof glass. FIGS. 7B, 7D, and 7F are enlarged sectional views illustrating the surface of each dust-proof glass to correspond to the plan views of FIGS. 7A, 7C, and 7E, respectively.

Figure 1:
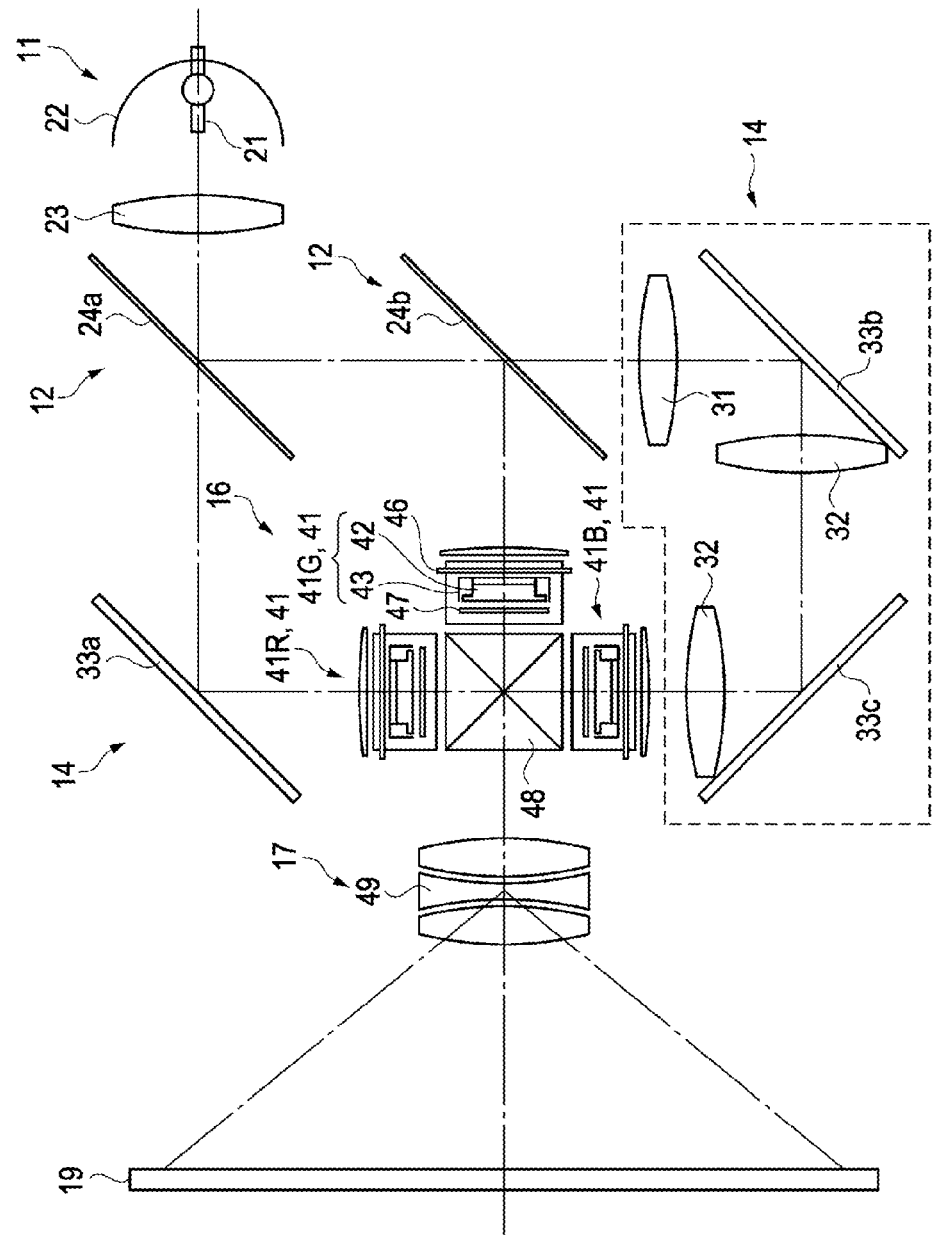
FIG. 1 is a schematic view illustrating the overall configuration of a projection type display apparatus according to a first embodiment.

DESCRIPTION OF EXEMPLARY
EMBODIMENTS

Hereinafter, an electro-optic device, a dust-proof substrate, and an electronic apparatus according to exemplary embodiments will be described with reference to the drawings.

In the exemplary embodiments of the electro-optic device including the electro-optic element, a projection type display apparatus will be described as an example of the electronic apparatus including the electro-optic device and a liquid crystal light modulation device (liquid crystal light valve) with a liquid crystal panel. In addition, an organic EL (Organic Electro Luminescence) apparatus including an organic EL device and an information apparatus including an organic EL display device will be described as examples of the electronic apparatus.

In the drawings referred in the following description, members or parts of the members are sometimes illustrated vertically or horizontally in different scales for easy illustration.

First Embodiment

The electro-optic device, the dust-proof substrate, and the electronic apparatus will first be described according to a first embodiment. In this embodiment of the electro-optic device including the electro-optic element, a projection type display apparatus will be described as an example of the electronic apparatus including the electro-optic device and the liquid crystal light modulation device (liquid crystal light valve) with the liquid crystal panel.

Projection Type Display Apparatus

The projection type display apparatus will first be described with reference FIG. 1. The projection type display apparatus is an apparatus which forms an optic image by modulating light flux emitted from a light source in accordance with image information and magnifies and projects the formed optic image on a screen. FIG. 1 is a schematic diagram illustrating the overall configuration of the projection type display apparatus.

As shown in FIG. 1, a projection type display apparatus 10 includes a light source device 11, a color separation optic device 12, a relay optic device 14, an optic modulation device 16, and a projection optic device 17.

The light source device 11 is an optic system which illuminates an image formed area of a light modulation device (liquid crystal panel) substantially uniformly. The light source device 11 includes a light source lamp 21 emitting light flux, a reflector 22, and a light source lens group 23. The light flux emitted in a radial shape from the light source lamp 21 is converged at a certain position by the reflector 22. The light source lens group 23, which includes a plurality of lenses or a lens array, allows the light flux converged by the reflector 22 to be parallel to a light axis.

The color separation optic device 12 is a device which disperses the light flux emitted from the light source device 11. The projection type display apparatus 10 is an apparatus which achieves a three-color display. The color separation optic device 12 disperses light flux emitted from the light source device 11 into three colors of red, green, and blue. The color separation optic device 12 includes a dichroic mirror 24a and a dichroic mirror 24b. The dichroic mirror 24a penetrates red light and reflects green light and blue light to change the direction of the light axis of the green light and the blue light into a direction which is substantially perpendicular to the direction of the light axis of the light flux emitted from the light source device 11. The dichroic mirror 24b penetrates the blue light and reflects the green light to change the direction of the light axis of the green light into a direction which is substantially parallel to the direction of the light axis of the light flux emitted from the light source device 11 and into the same direction as the direction in which the light flux emitted from the light source device 11 travels.

The relay optic device 14 includes an incident lens 31, a relay lens 32, reflective mirrors 33a, 33b, and 33c. The relay optic device 14 has a function of guiding the respective color light separated by the color separation optic device 12 up to liquid crystal light modulation devices 41.

The red light penetrating through the dichroic mirror 24a is reflected in the same direction as the direction, in which the green light and the blue light are reflected from the dichroic mirror 24a, by the reflective mirror 33a and is incident on a liquid crystal light modulation device 41R of the optic modulation device 16. The green light reflected from the dichroic mirror 24b is incident on a liquid crystal light modulation device 41G of the optic modulation device 16 without change.

The blue light penetrating through the dichroic mirror 24b passes through the incident lens 31, is reflected from the reflective mirror 33b, passes through the relay lens 32, is reflective from the reflective mirror 33c, passes through another relay lens 32, and then is incident on a liquid crystal light modulation device 41B of the optic modulation device 16. The blue light reflected from the reflective mirror 33b travels in the direction of the light axis parallel to the direction of the light axis of the red light passing through the dichroic mirror 24a and the direction of the light axis of the green light incident on the liquid crystal light modulation device 41G. The directions in which the light travels are the same.

The direction of the light axis of the blue light reflected from the reflective mirror 33c is parallel to the direction of the light axis of the red light reflected from the reflective mirror 33a and the directions of the light axes of the green light and the blue light reflected from the dichroic mirror 24a. The directions in which the light travels are opposite to each other. The directions of the light axes of the red light, the green light, and the blue light are changed in the same surface. Accordingly, the red light incident on the liquid crystal light modulation device 41R and the blue light incident on the liquid crystal light modulation device 41B are the same in the position and direction of the light axis. The directions in which the light travels are opposite to each other.

The optic modulation device 16 modulates three-color light emitted from the color separation optic device 12 in accordance with the image information, composites the respective modulated color light, and forms image light (color image). The optic modulation device 16 includes the liquid crystal light modulation devices 41, an entrance polarization plate 46, an exit polarization plate 47, and a cross dichroic prism 48.

As described above, the liquid crystal light modulation devices 41 include the liquid crystal light modulation device 41R for red light, the liquid crystal light modulation device 41G for green light, and the liquid crystal light modulation device 41B for blue light. Each liquid crystal light modulation device 41 includes a liquid crystal panel 42 and a mounting case 43 holding the liquid crystal panel 42. The entrance polarization plate 46 is disposed on the light flux incident side of each liquid crystal light modulation device 41. The exit polarization plate 47 is disposed on the light flux exiting side of each liquid crystal light modulation device 41.

The cross dichroic prism 48 is an optic element which composites the light modulated for each color light and emitted from the exit polarization plate 47 to form an image light (color image).

The incident polarization plate 46 penetrates only the light flux, which has a polarization axis of the substantially same direction of the light flux formed by a polarization changing element (not shown) among the incident flux made by entering each color light formed in a substantially one polarization direction by the polarization changing element, and absorbs the other light flux. The incident polarization plate 46 has a configuration in which a polarization film is attached to a light-transmitting substrate made of sapphire glass or crystal, for example.

The liquid crystal panel 42 of the liquid crystal light modulation device 41 has a configuration in which liquid crystal, which is an electro-optic material, is hermetically sealed between a pair of transparent substrates made of glass, quartz, or the like. In the liquid crystal panel 42, the assignment state of the liquid crystal is controlled in accordance with a driving signal from a control device and the polarization direction of the polarized light flux emitted from the incident polarization plate 46 is modulated. The liquid crystal panel 42 is held by the mounting case 43 of the liquid crystal light modulation device 41. The detailed configuration of the mounting case 43 holding the liquid crystal panel 42 is described below.

The exit polarization plate 47 has the same configuration as that of the incident polarization plate 46. The exit polarization plate 47 penetrates only the light flux having a polarization axis perpendicular to the transmission axis of the light flux in the incident polarization plate 46 among the light flux emitted from the liquid crystal light modulation device 41, and absorbs the other light flux.

The cross dichroic prism 48 is an optic element which composites the light modulated for each color light exiting from the exit polarization plate 47 to form image light (color image). The cross dichroic prism 48 has a square shape formed by attaching four right-angled prisms in a plan view. Two dielectric multi-layers are formed on the interfaces of the right-angled prisms. The dielectric multi-layers penetrate the color light penetrating through the exit polarization plate 47 facing a projective lens 49 of the projection optic device 17 and reflects the respective color light penetrating through the two exit polarization plates 47 (for the red light and the blue light). In this way, the respective color light modulated by the incident polarization plate 46, the liquid crystal light modulation devices 41, and the exit polarization plates 47 is composited to form the color image.

The composited light exits from the surface facing the projective lens 49 of the cross dichroic prism 48 and is projected onto a screen 19 by the projective lens 49. Then, the color image is displayed on the screen 19.

Liquid Crystal Panel

Figure 2A:
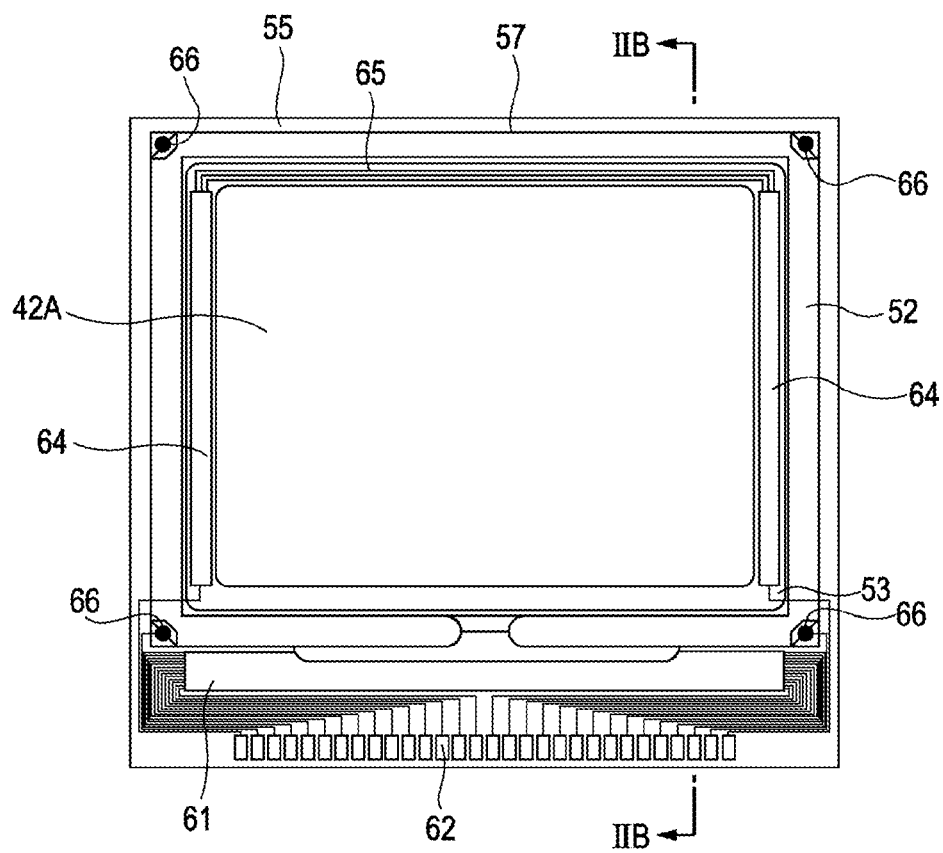
FIG. 2A is a plan view illustrating the constituent elements of a liquid crystal panel when viewed from a counter substrate.
Figure 2B:
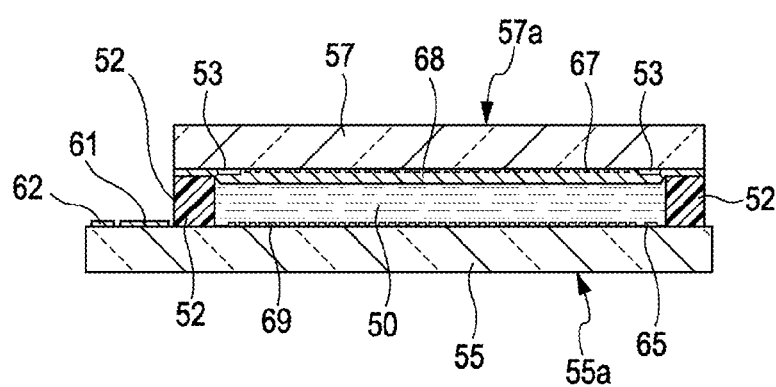
FIG. 2B is a schematic sectional view illustrating the cross-section surface of the liquid crystal panel taken along the line IIB-IIB of FIG. 2A.

Next, the liquid crystal panel 42 will be described with reference to FIGS. 2A and 2B. FIGS. 2A and 2B are schematic diagrams illustrating the configuration of the liquid crystal panel. FIG. 2A is a plan view illustrating the constituent elements of the liquid crystal panel when viewed from a counter substrate. FIG. 2B is a schematic sectional view illustrating the cross-section surface of the liquid crystal panel taken along the line IIB-IIB of FIG. 2A.

The liquid crystal panel according to this embodiment is a liquid crystal panel which is an example of an electro-optic panel and which has a driving circuit therein and realizes a TFT active matrix driving method.

In the liquid crystal panel 42, as shown in FIGS. 2A and 2B, a TFT array substrate 55 is disposed so as to face a counter substrate 57. A liquid crystal layer 50 is sealed between the TFT array substrate 55 and the counter substrate 57. The TFT array substrate 55 and the counter substrate 57 are attached to each other by a seal member 52 disposed in a seal area around an image display area 42A.

The seal member 52, which is used to attach the TFT array substrate 55 and the counter substrate 57, is made of ultraviolet curable resin or thermoset resin, for example. The seal member 52 is formed such that ultraviolet curable resin or thermoset resin is spread on the TFT array substrate 55 and then cured by ultraviolet radiation or heating in a manufacturing process. A gap material such as glass fibers or glass beads for maintaining the gap (a gap between the substrates) between the TFT array substrate 55 and the counter substrate 57 is dispersed within the seal member 52.

On the side of the counter substrate 57, a frame light-shielding film 53 which has a light shielding property and defines the frame area of the image display area 42A is disposed in parallel inside the sealed area of the seal member 52. Alternatively, a part or the whole of the frame light-shielding film 53 may be formed as an internal light-shielding film on the side of the TFT array substrate 55.

In an area outside the sealed area of the seal member 52 in the peripheral area of the image display area 42A, a data line driving circuit 61 and external circuit connection terminals 62 are disposed along one side of the TFT array substrate 55. Scanning line driving circuits 64 are disposed along two sides adjacent to the above one side so as to cover the above-described frame light-shielding film 53. In order to interconnect the two scanning line driving circuits 64 disposed on both the sides of the image display area 42A, a plurality of wiring lines 65 are disposed along the remaining one side of the TFT array substrate 55 so as to cover the frame light-shielding film 53.

Vertical conductive members 66 functioning as a conductive terminal between the TFT array substrate 55 and the counter substrate 57 are disposed in the four corners of the counter substrate 57. On the other hand, vertical conductive terminals are disposed in the areas facing the corners of the TFT array substrate 55. With such a configuration, the TFT array substrate 55 and the counter substrate 57 are electrically connected to each other.

As shown in FIG. 2B, wiring lines such as pixel switching TFTs, scanning lines, and data lines are formed on the TFT array substrate 55 and an alignment film (not shown) is formed on pixel electrodes 69. On the other hand, on the counter substrate 57, a lattice-shaped or stripe-shaped light-shielding film 68 is formed in addition to counter electrodes 67 and an alignment film (not shown) is formed on the uppermost layer. The liquid crystal layer 50, which is formed of one kind of nematic liquid crystal or several kinds of nematic liquid crystal, takes a predetermined alignment state between one pair of alignment films.

The light flux is incident on the counter substrate 57, passes through the liquid crystal to be modulated, and then exits from the TFT array substrate 55. A surface of the counter substrate 57 on which the light flux is incident is termed an incident surface 57a. A surface of the TFT array substrate 55 from which the light flux exits is termed an exit surface 55a.

Other circuits may be formed on the TFT array substrate 55 shown in FIGS. 2A and 2B in addition to the data line driving circuit 61 and the scanning line driving circuits 64. Examples of the other circuits include a sampling circuit which samples image signals of image signal lines to data lines, a precharge circuit which supplies precharge signals of a predetermined voltage level to a plurality of data lines ahead of image signals, and an inspection circuit which inspects the quality, defect, or the like of the electro-optic device during the manufacture or shipment.

Liquid Crystal Light Modulation Device

Figure 3:
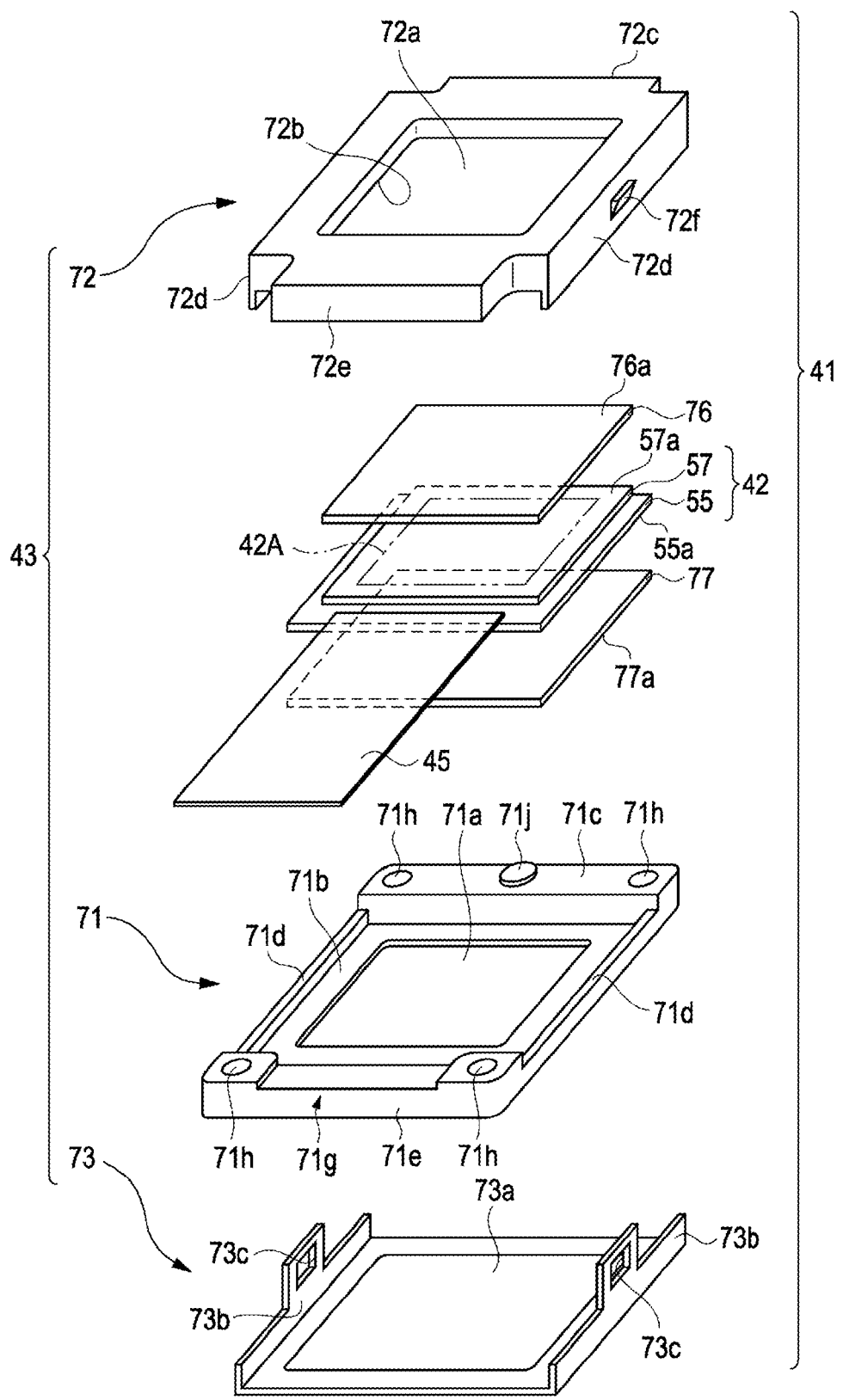
FIG. 3 is an exploded perspective view illustrating the main elements of a liquid crystal light modulation device.

Next, the configuration of the liquid crystal light modulation device 41 will be described with reference to FIG. 3 and FIGS. 4A and 4B. The main elements of the liquid crystal light modulation device 41 will first be described. FIG. 3 is an exploded perspective view illustrating the main elements of the quid crystal light modulation device.

As shown in FIG. 3, the liquid crystal light modulation device 41 is an example of the electro-optic device according to the invention. The liquid crystal light modulation device 41 includes the above-described liquid crystal panel 42, the mounting case 43, and a flexible printed circuit (hereinafter, referred to as "FPC") 45.

The FPC 45 is electrically connected to the liquid crystal panel 42 at the position of the external circuit connection terminals 62 of the liquid crystal panel 42. In the liquid crystal panel 42, an incident dust-proof glass 76 and an exit dust-proof glass 77 serving as a dust-proof substrate are attached and fixed on the incident surface 57a of the counter substrate 57 on which the modulated light is incident and the exit surface 55a of the TFT array substrate 55 which the incident light passes through the liquid crystal to be modulated and exits from, respectively. The incident dust-proof glass 76 and the exit dust-proof glass 77 each have a thickness of about 1.0 mm to 2.0 mm, since a focus is moved so as not to illuminate foreign matters attached to the surface of the liquid crystal panel 42 as an image upon projecting an image displayed in the liquid crystal light modulation device 41 of the projection type display apparatus 10.

The mounting case 43 includes a case plate 71 serving as a holding member, a case cover 72, and a case fixer 73.

The case plate 71 is a case which has a concave portion for accommodating the liquid crystal panel 42. The case plate 71 includes a frame area 71b for holding the peripheral area of the image display area 42A of the liquid crystal panel 42 (the exit surface 77a of the exit dust-proof glass 77). The frame area 71b is provided with an opening 71a with a size corresponding to that of the image display area 42A of the liquid crystal panel 42.

A side wall 71c, two side walls 71d, and a side wall 71e are formed in the outer circumference of the frame area 71b. Mounting holes 71h used to mount the liquid crystal light modulation device 41 in the projection type display apparatus 10 are formed on both the ends of the side wall 71c and the side wall 71e. A notched portion 71g holding the flexible printed circuit (FPC) 45 connected to the accommodated liquid crystal panel 42 is formed in the middle of the side wall 71e. A cylindrical protrusion 71j is formed in the middle of the side wall 71c.

The case cover 72 has four notched corners at the positions corresponding to the mounting holes 71h to form the case with the concave portion for accommodating the liquid crystal panel 42 together with the case plate 71. The case cover 72 includes a frame area 72b holding the peripheral area of the image display area 42A of the liquid crystal panel 42 (the incident surface 76a of the incident dust-proof glass 76). The frame area 72b is provided with an opening 72a with a size corresponding to that of the image display area 42A of the liquid crystal panel 42. In the case cover 72, a side wall 72c, two side walls 72d, and a side wall 72e are formed so as to surround the frame area 72b. A hook portion 72f protruding in a substantially triangular column shape is formed on each of the outer side surfaces (opposite to the frame area 72b) of the two side walls 72d.

The case fixer 73 is formed in a substantial U shape in a side view and includes an opening 73a with a size corresponding to that of the image display area 42A of the liquid crystal panel 42 on the surface coming into contact with the case plate 71. A hook opening 73c with a size corresponding to that of the hook portion 72f of the case cover 72 is formed in the protruding portion of each of both notched side walls 73b.

Next, the assembled liquid crystal light modulation device 41 will be described with reference to FIGS. 4A and 4B. FIGS. 4A and 4B are diagrams illustrating the overall shape of the liquid crystal light modulation device. FIG. 4A is an outer perspective view illustrating the overall shape of the liquid crystal light modulation device. FIG. 4B is a sectional view illustrating the cross-section shape of the liquid crystal light modulation device taken along the line IVB-IVB of FIG. 4A.

Figure 4A:
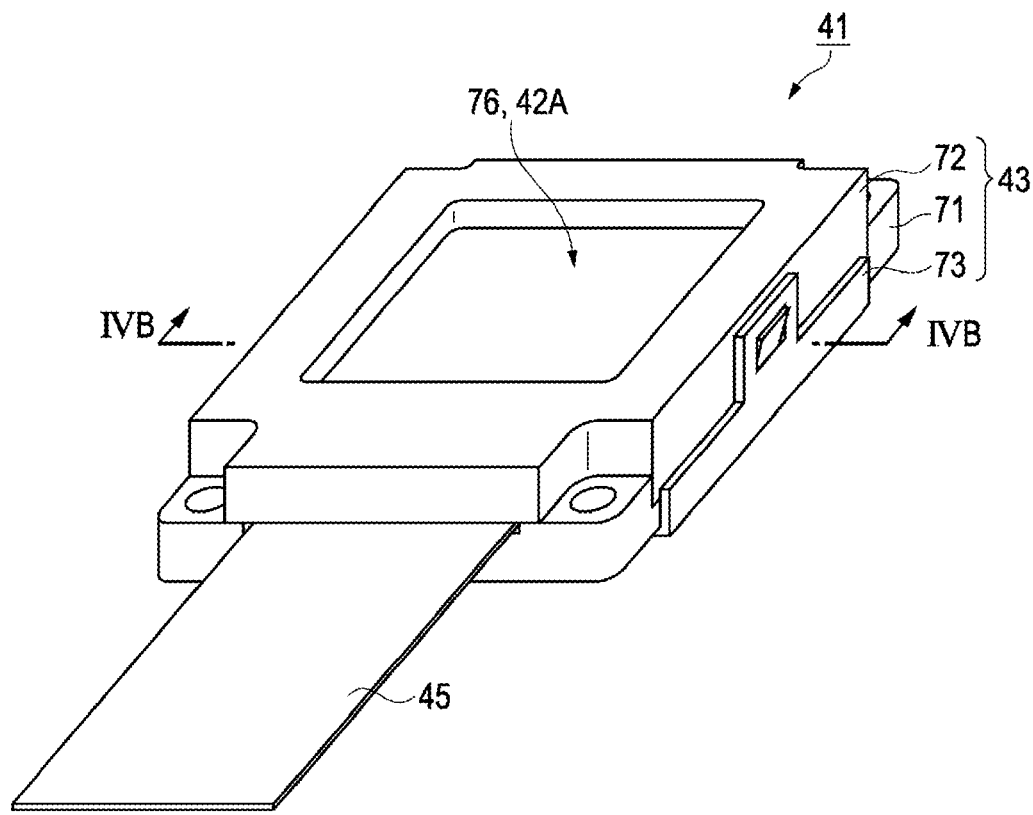
FIG. 4A is an outer perspective view illustrating the overall shape of the liquid crystal light modulation device.
Figure 4B:
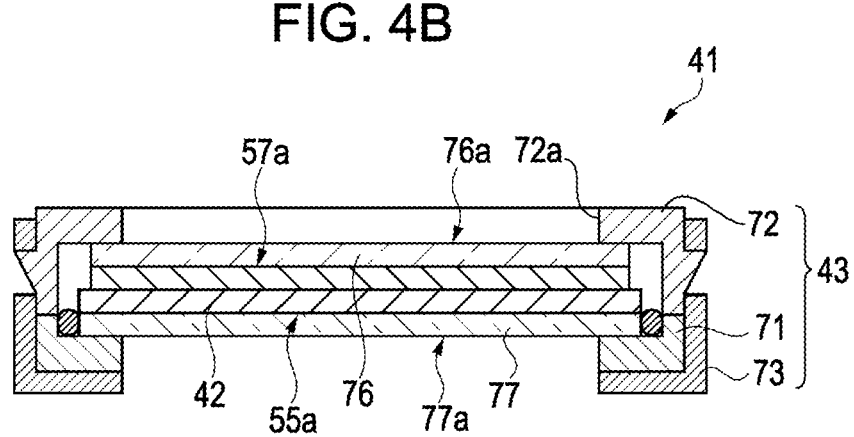
FIG. 4B is a sectional view illustrating the cross-section shape of the liquid crystal light modulation device taken along the line IVB-IVB of FIG. 4A.

As shown in FIGS. 4A and 4B, the liquid crystal panel 42 is disposed along with the incident dust-proof glass 76 or the exit dust-proof glass 77 between the case cover 72 and the case plate 71 and is held the mounting case 43. The middle of one end of the FPC 45 connected to the liquid crystal panel 42 is held by the notched portion 71g and the other end of the FPC 45 are outside the mounting case 43.

In the liquid crystal panel 42 held by the mounting case 43, the image display area 42A is held so as to face the opening 71a, the opening 72a, and the opening 73a. The light flux incident from the opening 72a penetrates the image display area 42A, is modulated, and exits from the opening 71a and the opening 73a. The incident surface 57a on which the light flux is incident and the exit surface 55a from which the light flux exits are isolated from the atmosphere by the incident dust-proof glass 76 or the exit dust-proof glass 77. The area facing the opening 71a or the opening 72a of the incident surface 76a of the incident dust-proof glass 76 and the exit surface 77a of the exit dust-proof glass 77 is in contact with the atmosphere.

Surface Shape of Dust-Proof Glass

Figure 5A:
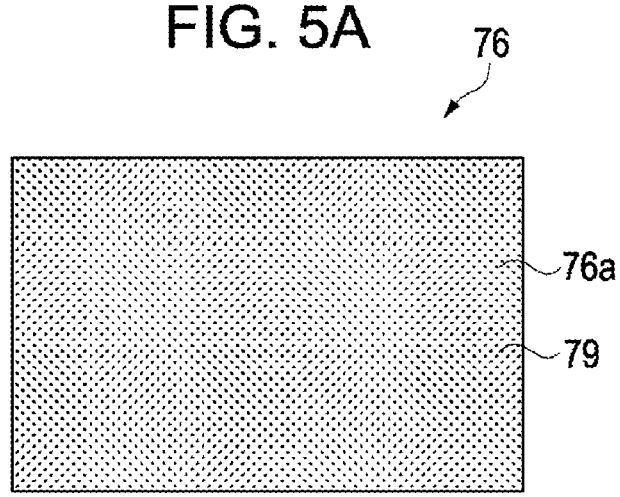
FIG. 5A is a plan view illustrating an incident dust-proof glass.
Figure 5B:
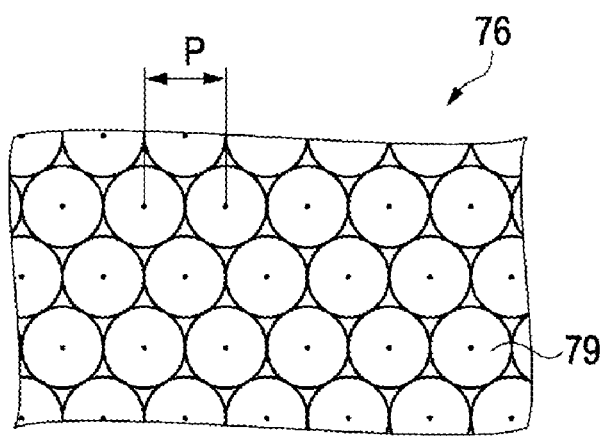
FIG. 5B is an enlarged plan view illustrating the surface of the incident dust-proof glass.
Figure 5C:
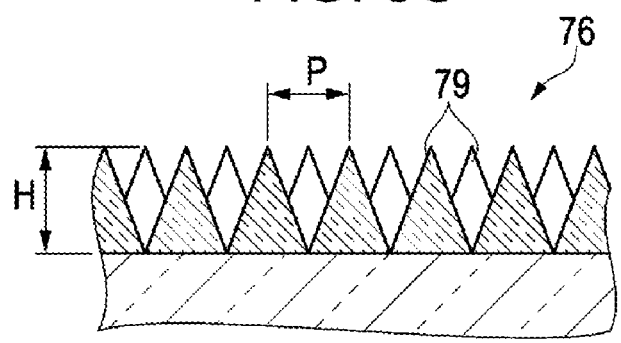
FIG. 5C is an enlarged sectional view illustrating the surface of the incident dust-proof glass.

The surface shape of the incident dust-proof glass 76 and the exit dust-proof glass 77 will be described with reference to FIGS. 5A to 5C. FIGS. 5A to 5C are explanatory diagrams illustrating the surface of the incident dust-proof glass. FIG. 5A is a plan view illustrating the incident dust-proof glass. FIG. 5B is an enlarged plan view illustrating the surface of the incident dust-proof glass. FIG. 5C is an enlarged sectional view illustrating the surface of the incident dust-proof glass.

As shown in FIG. 5A, the incident dust-proof glass 76 has protrusions 79 on substantially the entire surface of the incident surface 76a. As shown in FIGS. 5B and 5C, the protrusions 79 have a conical shape. The protrusions 79 are formed upright and formed closely on the incident surface 76a. A height H and a disposition pitch P of the protrusions 79 are smaller than 430 nm. The wavelength 430 nm is the wavelength of the blue light which has the shortest wavelength among the red light, the green light, and the blue light modulated by the liquid crystal light modulation devices 41 of the projection type display apparatus 10. The material of the protrusions 79 includes acrylic resin, silicon-based resin, or the same quartz or glass as that of the incident dust-proof glass 76.

On the exit surface 77a of the exit dust-proof glass 77, the same protrusions as the protrusions 79 are also formed on the substantially entire surface of the exit surface 77a.

Different Surface Shape of Dust-Proof Glass

Figure 6A:
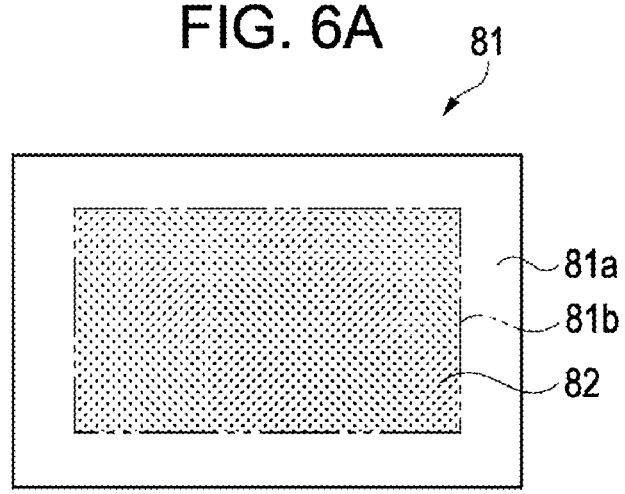
FIG. 6A is a plan view illustrating a dust-proof glass.
Figure 6B:
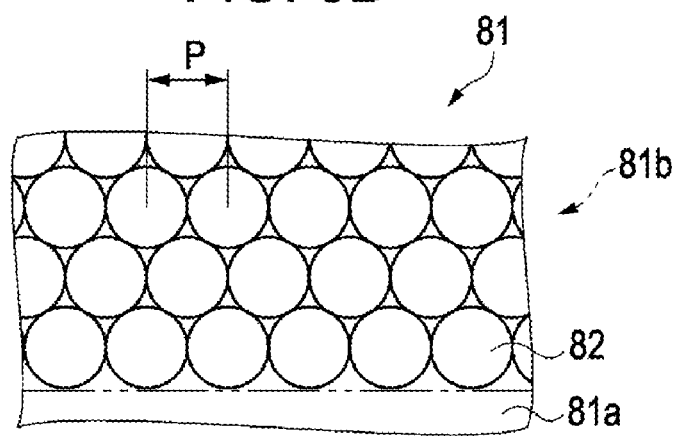
FIG. 6B is an enlarged plan view illustrating the surface of the dust-proof glass.
Figure 6C:
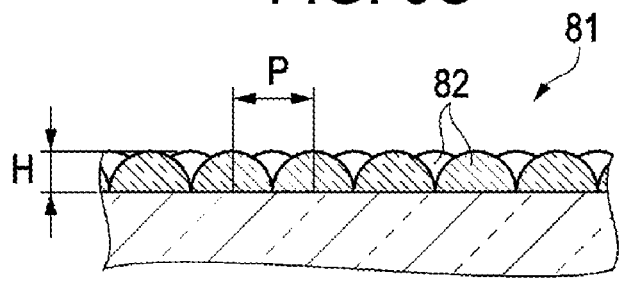
FIG. 6C is an enlarged sectional view illustrating the surface of the dust-proof glass.

Next, the configuration of the dust-proof glass having the different surface shape from the incident dust-proof glass 76 or the exit dust-proof glass 77 will be described with reference to FIGS. 6A to 6C and FIGS. 7A to 7F. FIGS. 6A to 6C and FIGS. 7A to 7F are explanatory diagrams illustrating the surface of a dust-proof glass. FIG. 6A is a plan view illustrating the dust-proof glass. FIG. 6B is an enlarged plan view illustrating the surface of the dust-proof glass. FIG. 6C is an enlarged sectional view illustrating the surface of the dust-proof glass.

As shown in FIG. 6A, a dust-proof glass 81 has protrusions 82 on a protrusion surface area 81b except for the peripheral surface 81a. The planar shape of the protrusion surface area 81b and the position of the protrusion surface area 81b on the surface 81a are the shape and the position corresponding to an image display area of a liquid crystal panel in a state where the dust-proof glass 81 is held along with the liquid crystal panel in a mounting case. When the liquid crystal panel is the liquid crystal panel 42, planar shape and the position of the protrusion surface area 81b on the surface 81a are the shape and the position corresponding to the image display area 42A in a state where the dust-proof glass 81 is held along with the liquid crystal panel 42 in the mounting case 43.

As shown in FIGS. 6B and 6C, the protrusions 82 have a hemispherical shape, and are formed upright and formed closely in the protrusion surface area 81b. A height H and a disposition pitch P of the protrusions 82 are smaller than 430 nm. The wavelength 430 nm is the wavelength of the blue light which has the shortest wavelength among the red light, the green light, and the blue light modulated by the liquid crystal light modulation devices of the projection type display apparatus which uses the three primary colors of light. Like the protrusions 79, the material of the protrusions 82 includes acrylic resin, silicon-based resin, or the same quartz or glass as that of the incident dust-proof glass 81.

FIGS. 7A, 7C, and 7E are enlarged plan views illustrating the surface of each dust-proof glass. FIGS. 7B, 7D, and 7F are enlarged sectional views illustrating the surface of each dust-proof glass to correspond to the plan views of FIGS. 7A, 7C, and 7E, respectively.

Protrusions 84 shown in FIGS. 7A and 7B are protrusions of which the cross-section on the surface of the dust-proof glass 83 has a cuneate shape. A height H and a disposition pitch P of the protrusions 84 are smaller than 430 nm.

Protrusions 86 shown in FIGS. 7C and 7D are formed upright on the surface of the dust-proof glass 85. The protrusions 86 have the shape of a hexagonal pyramid and are formed upright and closely on the surface of the dust-proof glass 85.

A height H and a disposition pitch P of the protrusions 86 are smaller than 430 nm.

Protrusions 88 shown in FIGS. 7E and 7F are formed upright on the surface of a dust-proof glass 87. The front end of the protrusions 88 has a cylindrical shape of the spherical shape. The protrusions 88 are formed upright and closely on the dust-proof glass 87. A height H and a disposition pitch P of the protrusions 88 are smaller than 430 nm.

Hereinafter, the advantages of the first embodiment will be described. The following advantages can be obtained according to this embodiment.

(1) The incident dust-proof glass 76 and the exit dust-proof glass 77 have the protrusions 79 and the protrusions similar to the protrusions 79 on the incident surface 76a and the exit surface 77a, respectively. Since the protrusions 79 and the protrusions similar to the protrusions 79 exist, the area where dusts or the like come into contact with the incident surface 76a or the exit surface 77a can be made smaller than that of a flat surface. Accordingly, it is possible to inhibit the dusts or the like from being attached to the incident dust-proof glass 76 or the exit dust-proof glass 77.

(2) The protrusions 79 have the conical shape. The height H and the disposition pitch P of the protrusions 79 are configured to be smaller than 430 nm. When several protrusions 79 having the conical shape are formed, a ratio of the protrusions 79 on the cross-section parallel to the incident surface 76a is gradually varied in the range of the height of the protrusions 79. Accordingly, it is possible to gradually vary a refractive index. By doing so, light with a wavelength longer than the height and the disposition pitch of the protrusions is known to be rarely reflected from the boundary surface.

The wavelength of the blue light with the shortest wavelength among the three primary colors of the light used in the projection type display apparatus 10 is mainly 430 nm. Since the protrusions 79 smaller than 430 nm or the like are disposed at a pitch smaller than 430 nm, it is possible to inhibit the light of the three primary colors from being reflected.

(3) The dust-proof glass 81 has the protrusions 82 on the protrusion surface area 81b except for the peripheral surface 81a. The planar shape of the protrusion surface area 81b and the position of the protrusion surface area 81b on the surface 81a are the shape and the position corresponding to the image display area of the liquid crystal panel in the state where the dust-proof glass 81 is held along with the liquid crystal panel in the mounting case. The image display area of the liquid crystal panel is an area contributing to improving the display quality or the like of the liquid crystal panel by inhibiting dusts or the like from being attached or inhibiting light from being reflected. By forming the protrusions only in the image display area, it is possible to form the protrusions more efficiently without forming unnecessary protrusions.

Second Embodiment

Next, an electro-optic device, a dust-proof substrate, and an electronic apparatus will be described according to a second embodiment. In this embodiment of the electro-optic device including an electro-optic element, the electronic apparatus including the organic EL display device and the electro-optic device will be described as an example of an information apparatus. The organic EL display device corresponds to the electronic-optic element and also corresponds to the electro-optic device.

Configuration of Organic EL Display Device

Figure 8:
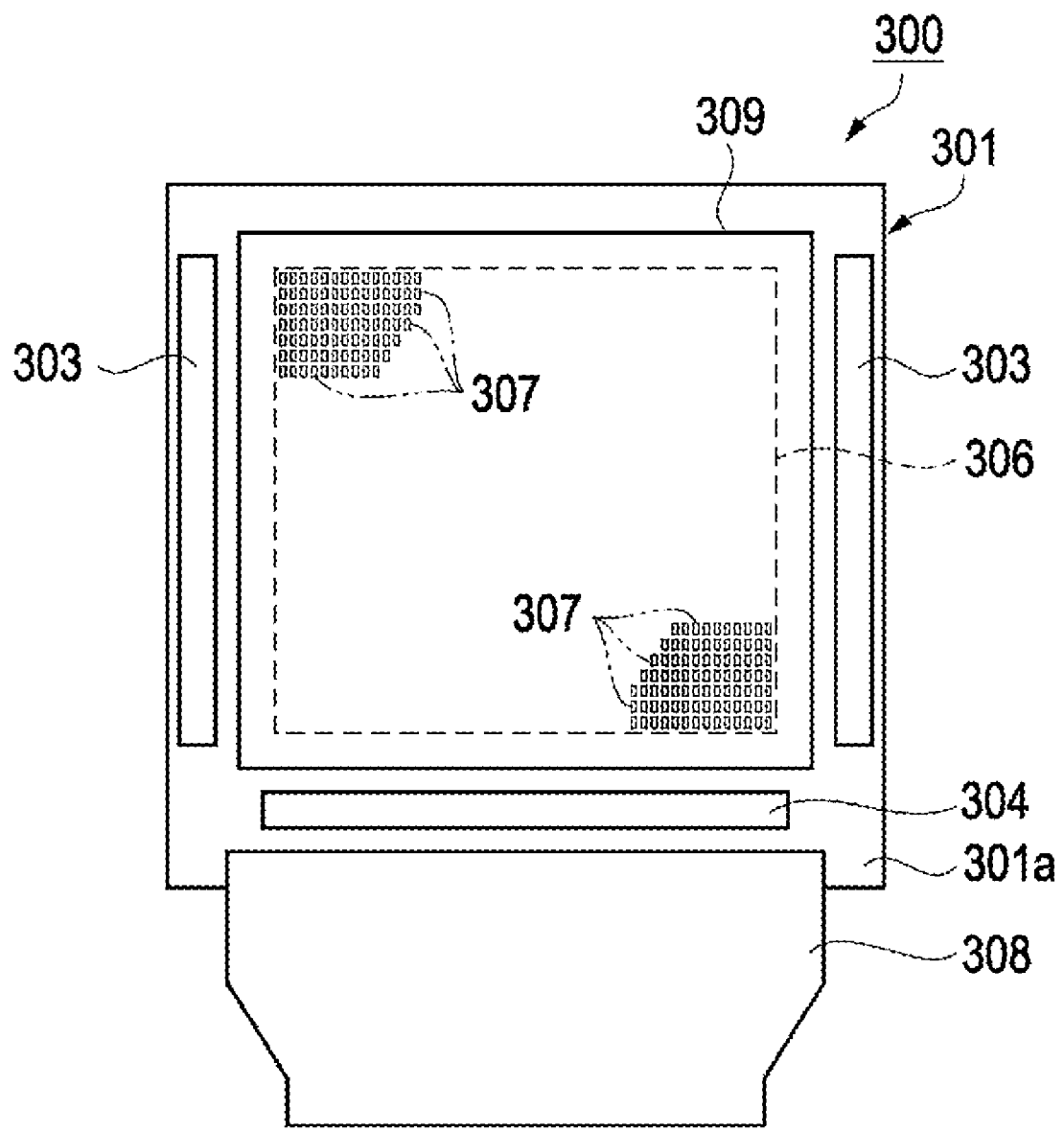
FIG. 8 is a schematic front view illustrating the planar configuration of an organic EL display device according to a second embodiment.
Figure 9A:
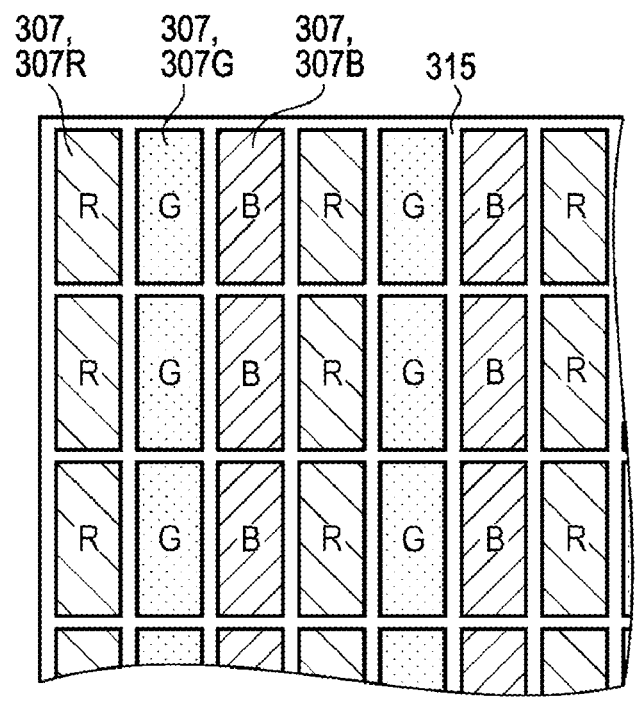
FIGS. 9A and 9B are plan views illustrating arrangement examples of an organic EL element.
Figure 9B:
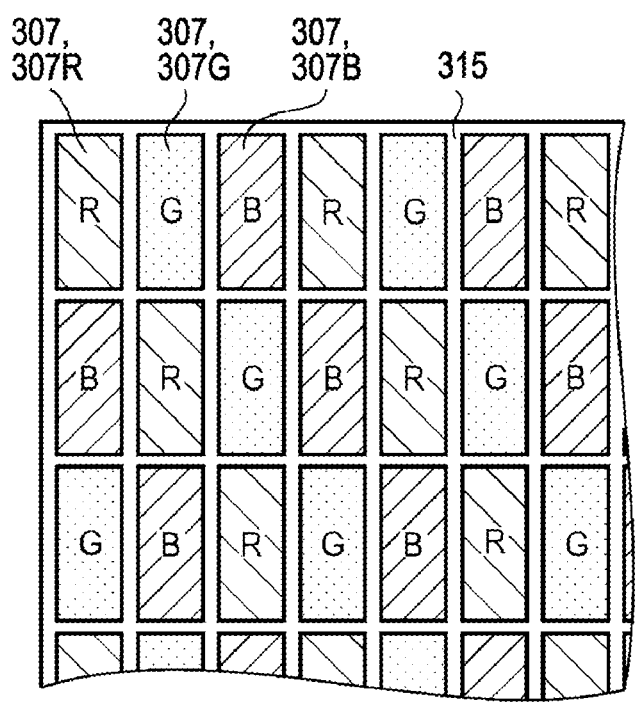

The configuration of the organic EL display device will first be described with reference to FIG. 8, FIGS. 9A and 9B, and FIG. 10. FIG. 8 is a schematic front view illustrating the planar configuration of the organic EL display device. FIGS. 9A and 9B are plan views illustrating arrangement examples of the organic EL element.

As shown in FIG. 8, an organic EL display device 300 includes an element substrate 301 which has a plurality of organic EL elements 307 serving as a luminescence element and a sealing substrate 309. The organic EL element 307 is a so-called color element. The organic EL display device 300 includes three-color organic EL elements 307, that is, red elements 307R (red system), green elements 307G (green system), and blue elements 307B (blue system), as shown in FIGS. 9A and 9B. The organic EL elements 307 are disposed in a display area 306. An image is displayed in the display area 306.

As shown in FIGS. 9A and 9B, the three-color organic EL elements 307 on the element substrate 301 are formed by light-emitting layers 317 (see FIG. 10), which are divided by partition walls 315 formed in a lattice-shaped pattern by a resin material having no light-transmitting property, for example, and extends in a dot matrix shape, in a plurality of substantially square areas.

The element substrate 301 includes a plurality of switching elements 312 (see FIG. 10), which serve as a driving element, at the positions corresponding to the organic EL elements 307. The switching element 312 is a TFT (Thin Film Transistor) element, for example. Two scanning line driving circuits 303 and one data line driving circuit 304 which drive the switching elements 312 are disposed in the frame-shaped regions larger than the sealing substrate 309. A terminal section 301a of the element substrate 301 is mounted with a flexible relay substrate 308 connecting the scanning line driving circuits 303 or the data line driving circuit 304 to an external driving circuit. The scanning line driving circuits 303 and the data line driving circuit 304 are formed such that semiconductor layers made of low-temperature poly-silicon are formed in advance on the surface of the element substrate 301, for example.

The known arrangement example of the organic EL elements 307 includes a stripe arrangement, mosaic arrangement, and delta arrangement. In the stripe arrangement, the same-color organic EL elements 307 are arranged in the columns of the matrix, as shown in FIG. 9A. In the mosaic arrangement, the organic EL elements 307 are arranged such that one organic EL element is moved in every row in a horizontal direction, as shown in FIG. 9B. In the three-color organic EL display device, arbitrary three three-color organic EL elements 307 are arranged in the columns and rows. In the delta arrangement, which is not illustrated in FIGS. 9A and 9B, the heights of the organic EL elements 307 are made different. In the three-color organic EL elements 307, arbitrary three three-color organic EL elements 307 are arranged with different colors so as to be adjacent to each other.

Figure 10:
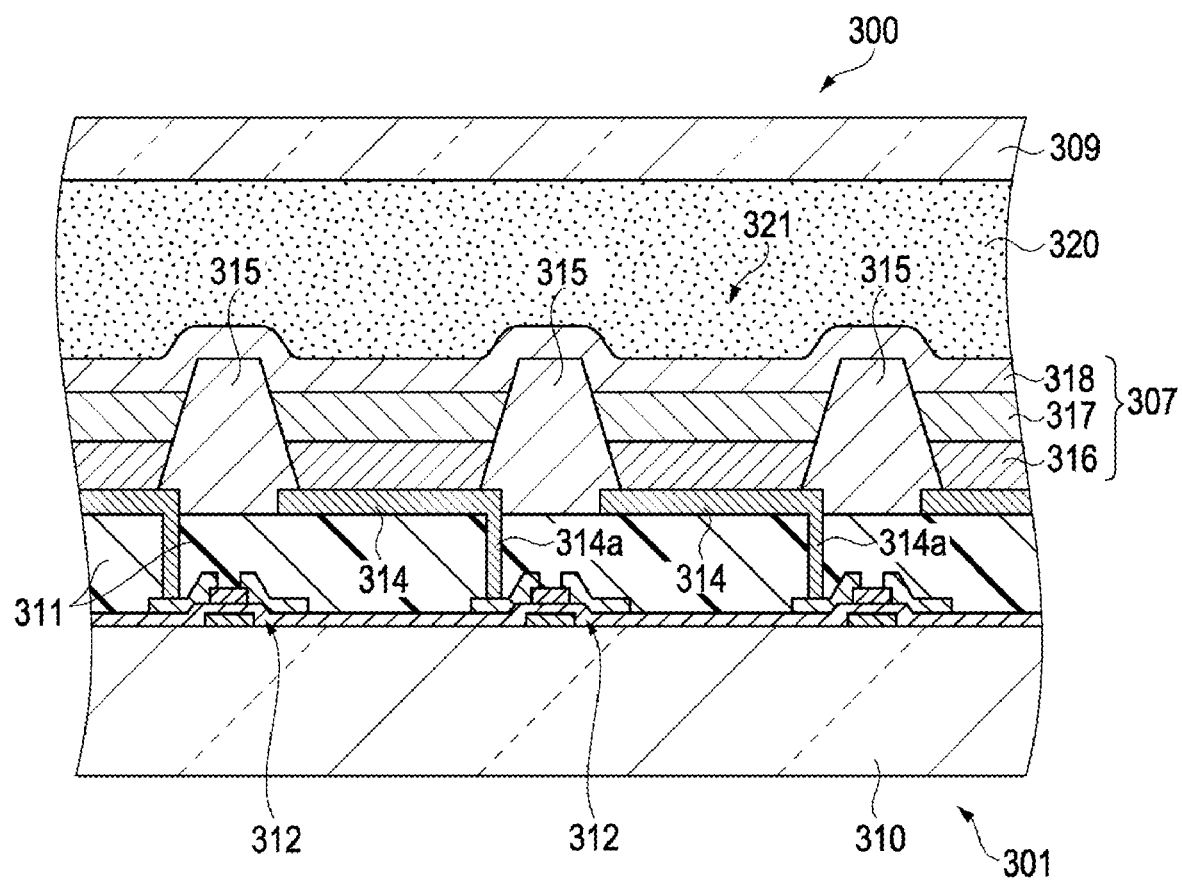
FIG. 10 is a sectional view illustrating the main elements including the organic EL element in the organic EL display device.

Next, the configurations of the organic EL display device 300 and the organic EL element 307 will be described. FIG. 10 is a sectional view illustrating the main elements including the organic EL element in the organic EL display device. As shown in FIG. 10, the element substrate 301 includes: a glass substrate 310; the plurality of switching elements 312 formed on one surface of the glass substrate 310; insulating layers 311 formed so as to cover the switching elements 312; a plurality of pixel electrodes 314 formed on the insulating layers 311 and electrically connected to the switching elements 312 through conductive layers 314a; and partition walls 315 formed between the plurality of pixel electrodes 314. The element substrate 301 also includes: hole transport layers 316 on the pixel electrodes 314 of an area (hereinafter, referred to as "pixel areas 321") partitioned by the partition walls 315; light emission layers 317 laminated on the hole transport layers 316; and a counter electrode 318 formed so as to cover the light emission layers 317 and the partition walls 315. In the organic EL display device 300, the sealing substrate 309 is disposed so as to face the counter electrode 318 of the element substrate 301 so that an inert gas 320 is sealed between the counter electrode 318 and the sealing substrate 309. The hole transport layer 316, the light emission layer 317, and the counter electrode 318 formed on the pixel electrode 314 in the area partitioned by the partition walls 315 correspond to the organic EL element 307.

The red elements 307R, the green elements 307G, and the blue elements 307B are formed by disposing the red emission layers 317R (red system) emitting red light, the green emission layers 317G (green system) emitting green light, and the blue emission layers 317B (blue system) emitting blue light in the pixel areas 321. A pair of the organic EL elements 307 constituted by one red element 307R, one green element 307G, and one blue element 307B form a pixel which is the minimum unit forming an image. A full-color display is performed by selectively emitting one or the combination of the red element 307R, the green element 307G, and the blue element 307B in one pixel.

Surface Shape of Sealing Substrate

Figure 11A:
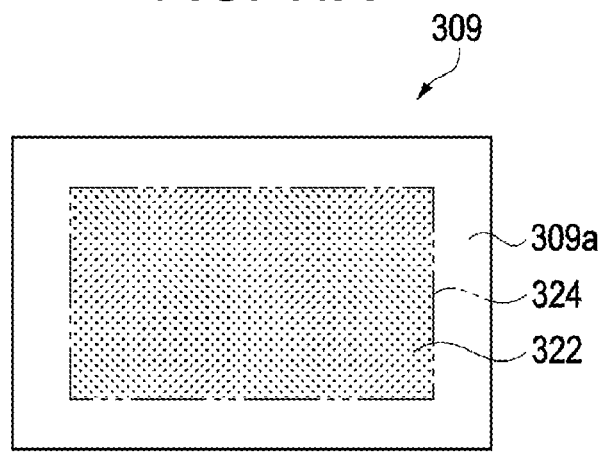
FIG. 11A is a plan view illustrating a sealing substrate.
Figure 11B:
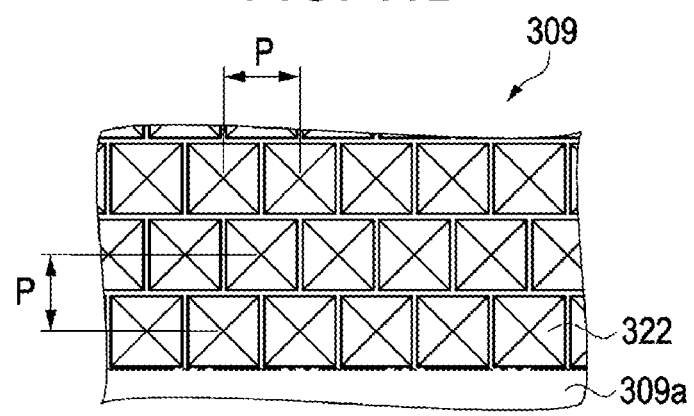
FIG. 11B is an enlarged plan view illustrating the surface of the sealing substrate.
Figure 11C:
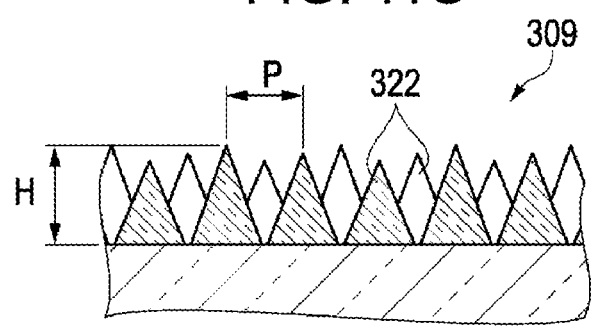
FIG. 11C is an enlarged sectional view illustrating the surface of the sealing substrate.

Next, the surface shape of the sealing substrate 309 will be described with reference to FIGS. 11A to 11C. FIGS. 11A to 11C are explanatory diagrams illustrating the surface of the sealing substrate. FIG. 11A is a plan view illustrating the sealing substrate. FIG. 11B is an enlarged plan view illustrating the surface of the sealing substrate. FIG. 11C is an enlarged sectional view illustrating the surface of the sealing substrate.

As shown in FIG. 11A, the sealing substrate 309 is provided with protrusions 322 in protrusion surface area 324 except for the peripheral surface 309a. The surface 309a is opposed to the surface of the sealing substrate 309 facing the counter electrode 318 in a state where the sealing substrate 309 is assembled in the organic EL display device 300. The planar shape of the protrusion surface area 324 and the position of the protrusion surface area 324 on the surface 309a are the planar shape and the position which contain a portion overlapping with the display area 306 of the element substrate 301 in a planar direction in the state where the sealing substrate 309 is assembled in the organic EL display device 300.

As shown in FIGS. 11B and 11C, the protrusions 322 have the shape of a quadrangular pyramid and are formed closely on the surface 309a. A height H and a disposition pitch P of the protrusions 322 are smaller than 430 nm. The wavelength 430 nm is the wavelength of the blue light which is emitted by the blue element 307B among the light emitted by the organic EL elements 307 in the organic EL display device 300. The material of the protrusions 322 includes acrylic resin, silicon-based resin, or the same quartz or glass as that of the sealing substrate 309.

The protrusions formed on the sealing substrate 309 may be the protrusions described with reference to FIGS. 5A to 5C, FIGS. 6A to 6C, and FIGS. 7A to 7F according to the first embodiment.

The sealing substrate 309 corresponds to the dust-proof substrate. The organic EL display device 300 corresponds to the electro-optic element and also corresponds to the electro-optic device.

Information Apparatus

Next, a specific example of an information apparatus including the organic EL display device will be described with reference to FIGS. 12A to 12D. The information apparatus according to this embodiment is an information apparatus which includes the above-described organic EL display device 300 or an organic EL display device having the same configuration as that of the organic EL display device 300.

Figure 12A:
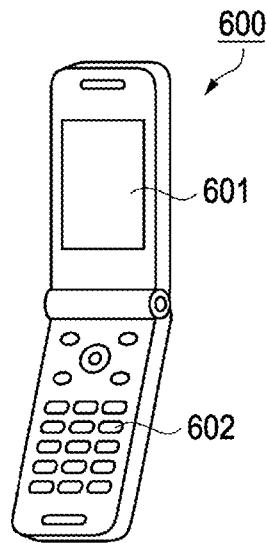
FIG. 12A is a perspective view illustrating an example of a portable telephone.

FIG. 12A is a perspective view illustrating an example of a portable telephone. As shown in FIG. 12A, a portable phone 600 includes an organic EL display unit 601 including the above-described organic EL display device 300 and a portable phone main body 602.

Figure 12B:
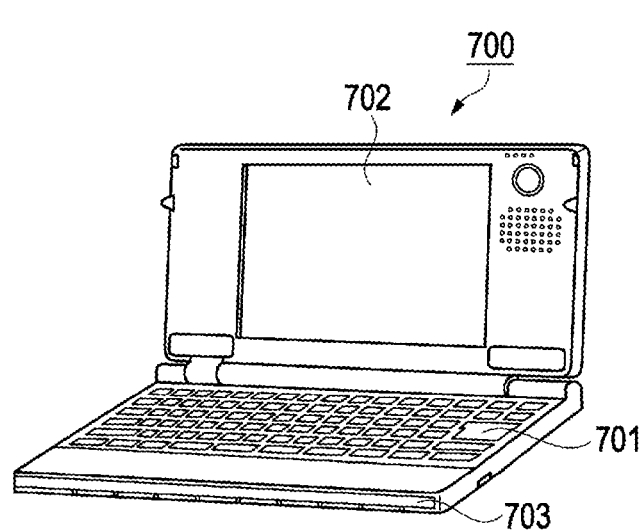
FIG. 12B is a perspective view illustrating an example of a portable information processing apparatus such as a word processor or a PC.

FIG. 12B is a perspective view illustrating an example of a portable information processing apparatus such as a word processor or a personal computer. As shown in FIG. 12B, an information processing apparatus 700 includes an organic EL display unit 702 including an organic EL display device having the same configuration as the organic EL display device 300, an input unit such as a keyboard 701, and an information processing main body 703.

Figure 12C:
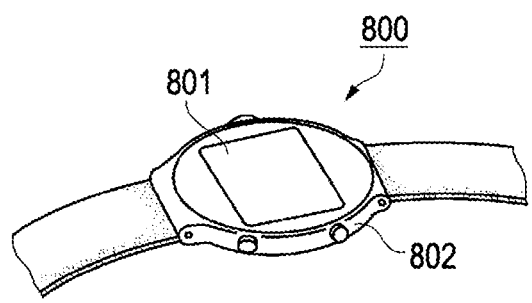
FIG. 12C is a perspective view illustrating an example of an electronic apparatus such as a wristwatch.

FIG. 12C is a perspective view illustrating an example of an electronic apparatus such as a wristwatch. As shown in FIG. 12C, a wristwatch 800 includes an organic EL display unit 801 including an organic EL display device having the same configuration as the organic EL display device 300 and a wristwatch main body 802.

Figure 12D:
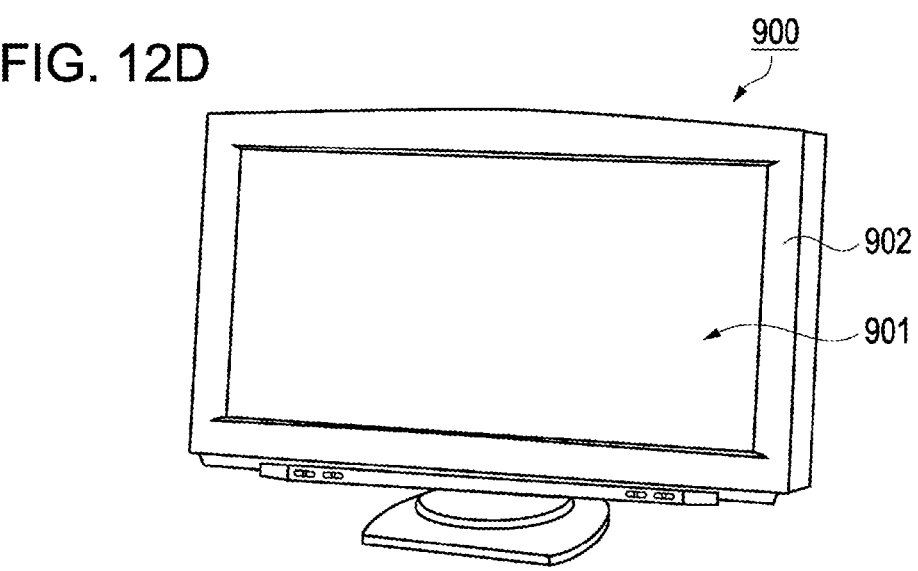
FIG. 12D is an outer perspective view illustrating an organic EL television as an example of an information apparatus.

FIG. 12D is an outer perspective view illustrating an organic EL television as an example of an information apparatus. As shown in FIG. 12D, an organic EL television 900 includes a display unit 901 and a television main body 902. The display unit 901 mounts an organic EL display device having the same configuration as the above-described organic EL display device 300 as a display section.

Hereinafter, advantages according to the second embodiment will be described. The following advantages can be obtained according to this embodiment.

(1) The sealing substrate 309 is provided with the protrusions 322 in the protrusion surface area 324 of the surface 309a. Since the protrusions 322 exist, the area where dusts or the like come into contact with the surface 309a can be made smaller than that of a flat surface. Accordingly, it is possible to inhibit the dusts or the like from being attached to the surface 309a of the sealing substrate 309.

(2) The protrusions 322 have the shape of a quadrangular pyramid. The height H and the disposition pitch P of the protrusions 322 are configured to be smaller than 430 nm. When several protrusions 322 having the shape of a quadrangular pyramid are formed, a ratio of the protrusions 322 on the cross-section parallel to the surface 309a is gradually varied in the range of the height of the protrusions 322. Accordingly, it is possible to gradually vary a refractive index. By doing so, light with a wavelength longer than the height and the disposition pitch of the protrusions is known to be rarely reflected from the boundary surface.

The wavelength of the blue light with the shortest wavelength among the three primary colors of the light emitted by the organic EL display device 300 is mainly 430 nm. Since the protrusions 322 smaller than 430 nm are disposed at a pitch smaller than 430 nm, it is possible to inhibit the light of the three primary colors from being reflected.

(3) The sealing substrate 309 has the protrusions 322 on the protrusion surface area 324 except for the peripheral surface 309a. The planar shape of the protrusion surface area 324 and the position of the protrusion surface area 324 on the surface 309a are the planar shape and the position which contain the portion overlapping with the display area 306 of the element substrate 301 in a planar direction in the state where the sealing substrate 309 is assembled in the organic EL display device 300. The display area 306 is an area contributing to improving the display quality or the like of the organic EL display device 300 by inhibiting dusts or the like from being attached or inhibiting light from being reflected. By forming the protrusions only in the image display area, it is possible to form the protrusions more efficiently without forming unnecessary protrusions.

The exemplary embodiments have been described with reference to the drawings. The invention is not limited to the above-described embodiments. Of course, the invention may be modified in various forms within the scope of the invention without departing from the gist of the information. The invention may be modified as follows.

Modified Example 1

In the above-described first embodiment, the liquid crystal panel 42 includes the incident dust-proof glass 76 and the exit dust-proof glass 77 having the protrusions similar to the protrusions 79. However, the dust-proof substrate may not be necessarily disposed both on the incident side and the exit side of the light flux in the electro-optic element. The dust-proof glass serving as the dust-proof substrate may be disposed on one of the incident side and the exit side of the light flux.

The protrusions similar to the protrusions 79 may not be necessarily formed in both the dust-proof substrates on the incident side and the exit side of the light flux. The protrusions may be formed in one dust-proof substrate on the incident side or the exit side of the light flux.

Modified Example 2

In the above-described first embodiment, the liquid crystal panel 42 includes the incident dust-proof glass 76 and the exit dust-proof glass 77 having the protrusions similar to the protrusions 79. However, it is not necessary to dispose the dust-proof glass and form the protrusions on the dust-proof glass. For example, the protrusion may be formed on one or both surfaces of the polarization plates disposed on the incident side and the exit side, such as the incident polarization plate 46 and the exit polarization plate 47.

Modified Example 3

In the above-described embodiments, the height H and the disposition pitch P of the protrusions 79 are configured to be smaller than 430 nm, which is the wavelength of the blue light having the shortest wavelength among the red light, the green light, and the blue right modulated by the liquid crystal light modulation device 41 of the projection type display apparatus 10. In addition, the height H and the disposition pitch P of the protrusions 322 are configured to be smaller than 430 nm of the blue light emitted by the blue elements 307B. The wavelength of the blue light is the shortest wavelength among the red light, the green light, and the blue light emitted by the blue elements 307 of the organic EL display device 300. However, it is not necessary to define the size of the protrusions depending on the wavelength of the light emitted by the electro-optic device. The protrusions may be formed so as to have the height and the disposition pitch smaller than the shortest wavelength of the light in the visible light. By forming the protrusions so as to have the height and the disposition pitch smaller than the shortest wavelength present in the visible light, it is possible to inhibit the visible light incident on the display unit of the electro-optic device from the outside from being reflected from the display surface. The shortest wavelength present in the visible light is mainly 380 nm. Accordingly, the protrusions may be formed so as to have the height and the disposition pitch smaller than 380 nm.

Modified Example 4

In the above-described embodiments, the protrusions 79 or the like with the conical shape have been exemplified, but the shape of the protrusions is not limited to the shapes exemplified in the embodiments. For example, the top of the protrusion may be formed in a conical shape or a pyramidal shape of the sphere. The protrusion may have any shape as long as the area of the protrusion on the cross-section parallel to the surface on which the protrusion is formed is gradually varied from the surface on which the protrusions are formed in a direction perpendicular to the surface on which the protrusion is formed.

Modified Example 5

In the above-described embodiments, the protrusions 79 or the protrusions 82 are disposed so as to be adjacent to each other. However, the protrusions may not be formed so as to be adjacent to each other. The protrusions may be disposed so as to be distant from each other. Alternatively, like the protrusions 84, some of the protrusions may be disposed so as to overlap with each other.

Modified Example 6

In the above-described embodiments, the plurality of protrusions 79 disposed on the incident surface 76a of the incident dust-proof glass 76 or the plurality of protrusions 82 disposed on the protrusion surface area 81b of the dust-proof glass 81 are formed so as to have substantially the same height and shape. However, the plurality of protrusions may not have the same height and shape. The plurality of protrusions may have different sizes, like the protrusions 322 disposed in the protrusion surface area 324 of the sealing substrate 309. Alternatively, the protrusions with the wall shape, like the protrusions 84, may have different heights or different shapes of the cross-section.

Modified Example 7

In the above-described first embodiment, the liquid crystal light modulation device 41 which includes the liquid crystal panel 42, which is an example of the electro-optic element, and is used as a projection type display apparatus has been described as an example of the electro-optic device. However, the liquid crystal light modulation device is not limited to the projection type display A liquid crystal display device having the configuration in which an image displayed in the display unit is directly viewed may be used. In this device, a dust-proof glass having one function of altering the focus so as not to illuminate foreign matters or the like attached on the surface of the liquid crystal panel 42 as an image, like the incident dust-proof glass 76 or the exit dust-proof glass 77 is not usually used. However, by forming the above-described protrusions on the dust-proof substrate or the surface of the polarization plate, it is possible to obtain the above-described advantages.

As the liquid crystal element, a transmissive liquid crystal element or a reflective liquid crystal element (LCOS: Liquid Crystal On Silicon) may be used.

Modified Example 8

In the above-described embodiments, the liquid crystal light modulation device 41 including the liquid crystal panel 42, which is an example of the electro-optic element, and the organic EL display device 300 have been described as the examples of the electro-optic device. However, the electro-optic device achieving the advantages by formed the above-described protrusions is not limited to the liquid crystal device or the organic EL device. Examples of the electro-optic device other than the liquid crystal device or the organic EL device include a plasma display panel (PDP), a field emission display (FED) (surface-conduction electron-emitter display (SED)), and a digital mirror device (DMD).

Modified Example 9

In the above-described second embodiment, the display unit of the organic EL display device 300 has been used as the display device included in the information apparatus. However, the display device included in the information apparatus is not limited to the organic EL display device. Examples of the display device include the above-described liquid crystal display device, a plasma display panel, a field emission display, and a digital mirror device.

What is claimed is:

1. An electro-optic device comprising:
an electro-optic element including a pair of substrates interposing an electro-optical material, the electro-optic element having an image display area; and
a dust-proof substrate which is joined to at least one surface of the electro-optic element, the dust-proof substrate having a plurality of protrusions on a surface opposite to the surface of the electro-optic element to which the dust-proof substrate is joined, wherein the protrusions are provided in an area that overlaps the image display area.

2. The electro-optic device according to claim 1, wherein the dust-proof substrate is joined to each of a light-entering surface and a light-exiting surface of the electro-optic element.

3. The electro-optic device according to claim 1, wherein the dust-proof substrate is disposed on a light-exiting surface of the electro-optic element.

4. The electro-optic device according to claim 1, wherein the height of the plurality of protrusions and the disposition pitch between the protrusions are smaller than the wavelength of incident light which is incident on the electro-optic element.

5. The electro-optic device according to claim 1, wherein the height of the plurality of protrusions and the disposition pitch between the protrusions are smaller than 430 nm.

6. The electro-optic device according to claim 1, wherein the height of the plurality of protrusions and the disposition pitch between the protrusions are smaller than the wavelength of the visible light.

7. The electro-optic device according to claim 1, wherein the height of the plurality of protrusions and the disposition pitch between the protrusions are smaller than 380 nm.

8. The electro-optic device according to claim 1, wherein the protrusions are formed upright on the surface of the dust-proof substrate and the shape of at least one cross-section of the protrusion perpendicular to the surface of the dust-proof substrate is cuneate.

9. The electro-optic device according to claim 8, wherein the front end of the cuneate shape is formed in an arc shape.

10. The electro-optic device according to claim 1, wherein the protrusions are formed in a spherical crown shape upright on the surface of the dust-proof substrate.

11. The electro-optic device according to claim 1, wherein the protrusions are formed upright on the surface of the dust-proof substrate and have a cylindrical shape, a prismatic shape, a conical shape, or a pyramidal shape of which the front end is formed in a spherical crown shape.

12. The electro-optic device according to claim 1, wherein the plurality of protrusions is disposed in an area corresponding to an optic modulation area of the electro-optic element on the surface of the dust-proof substrate.

13. The electro-optic device according to claim 12, further comprising:
a holding case which holds the electro-optic element or the electro-optic element and the dust-proof substrate,
wherein the holding case comes into contact with the electro-optic element or a portion where the protrusions are not formed on the dust-proof substrate to hold the electro-optic element or the dust-proof substrate.

14. An electronic apparatus comprising the electro-optic device according to claim 1.

15. The electro-optic device according to claim 1, wherein the protrusions are not provided outside the area that overlaps the image display area.

* * * * *